United States Patent [19]

Church et al.

[11] Patent Number: 5,280,615
[45] Date of Patent: Jan. 18, 1994

[54] OUT OF ORDER JOB PROCESSING METHOD AND APPARATUS

[75] Inventors: Craig R. Church, Havertown; Joseph S. Schibinger, Phoenixville; Andrew T. Jennings, West Chester, all of Pa.

[73] Assignee: Unisys Corporation, Blue Bell, Pa.

[21] Appl. No.: 787,676

[22] Filed: Nov. 4, 1991

Related U.S. Application Data

[63] Continuation-in-part of Ser. No. 498,281, Mar. 23, 1990.

[51] Int. Cl.$^5$ .............................................. G06F 9/06
[52] U.S. Cl. ........................... 395/650; 364/DIG. 1; 364/280.3; 364/280.8
[58] Field of Search ......... 395/375, 650; 364/DIG. 1

[56] References Cited

U.S. PATENT DOCUMENTS

| | | | |
|---|---|---|---|
| 4,456,958 | 6/1984 | DeSantis et al. | 364/DIG. 1 |
| 4,466,061 | 8/1984 | DeSantis et al. | 364/DIG. 1 |
| 4,468,736 | 8/1984 | DeSantis et al. | 364/DIG. 1 |
| 4,562,538 | 12/1985 | Berenbaum et al. | 364/DIG. 1 |
| 4,720,779 | 1/1988 | Reynard et al. | 364/DIG. 1 |
| 4,773,041 | 9/1988 | Hassler et al. | 364/DIG. 2 |
| 4,825,360 | 5/1989 | Knight, Jr. et al. | 364/DIG. 1 |
| 4,847,755 | 7/1989 | Morrison et al. | 364/DIG. 1 |
| 4,875,160 | 10/1989 | Brown, III | 364/DIG. 1 |
| 4,980,824 | 12/1990 | Tulpule et al. | 364/DIG. 1 |
| 4,985,826 | 1/1991 | Jonsson et al. | 364/DIG. 1 |

FOREIGN PATENT DOCUMENTS

0399757 11/1990 European Pat. Off. ....... G06F 9/38

OTHER PUBLICATIONS

"Associative Register Assignment Stack", Dec. 1984, pp. 3824–3826, *IBM Technical Disclosure Bulletin*, vol. 27, No. 7A, N.Y.

R. D. Acosta, et al., "An Instruction Issuing Approach to Enhancing Performance in Multiple Functional Unit Processors", Sep. 1986, pp. 815–828, IEEE Transactions on Computers, vol. C-35, No. 9, N.Y., pp. 816–817, 821.

"Memory Data Hold Register", Apr. 1986, pp. 4844–4845, *IBM Technical Disclosure Bulletin*, vol. 28, No. 11, N.Y.

*Primary Examiner*—Thomas M. Heckler
*Attorney, Agent, or Firm*—Ratner & Prestia

[57] ABSTRACT

A computer system executes steps to provide results in an order different from an intended order. Instructions are concatenated into a plurality of jobs. Different invocations of a variable within the computer instruction stream may be assigned respectively different storage locations and each storage location may correspond to a different job. When all the storage locations associated with a particular job indicate available resources (e.g. valid variable input), the job may be executed. A mechanism allows for job re-execution, if needed, due to interrupt or error.

18 Claims, 6 Drawing Sheets

```
10  X: = a+b
20  Y: = f(x)
30  X: = c+d
40  Y: = f(x)
```
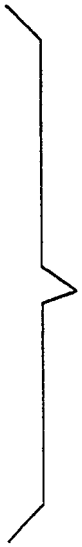
```
10  X₀: = a+b
20  Y:  = f(x₀)
30  Xₙ: = c+d
40  Y:  = f(xₙ)
```
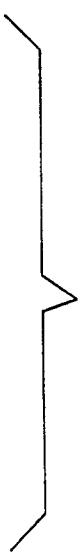

OUT OF ORDER JOB PROCESSING METHOD AND APPARATUS

This application is a continuation-in-part of copending patent application Ser. No. 07/498,281, filed Mar. 23, 1990, which has common inventorship and is assigned to the same entity as the present invention.

BACKGROUND OF THE INVENTION

Field of the Invention

This invention relates to a method and mechanism for executing the object code for a computer program in an order other than as originally written and compiled wherein such execution achieves the same result as if the code had been executed sequentially as compiled.

Description of Related Art

Traditionally, computers are known to execute the object code of a computer program in a sequential order. Generally, this order is determined by the sequence of instructions as written by the programmer. A computer designed to so execute is often referred to as having a von Neumann architecture. A drawback of such a design is that a processor may sit idle waiting to execute an instruction that requires some other resource in the computer system that is not yet available.

A known method of taking advantage of this idle time is to execute multiple programs concurrently. In this way, while one program waits for a resource, another program may be executed. However, the individual instruction code sequences are still executed in a sequential order. This slows the completion of an individual program's execution whenever it must wait for resources. Additionally, the processor must incur some overhead in performing process switching whenever the program which it is executing requires an unavailable resource.

The importance of completing an individual program as rapidly as possible has recently been highlighted by the increasing demand for transaction processing systems. Such systems employ computers to centralize the completion of a large number of transactions. These transactions often involve access to a common resource, such as a system database. It is important in such systems to complete an individual transaction as rapidly as possible. That means the program performing the transaction must be executed as quickly as possible It has been observed that the instructions of a program tend to occur in sequences that are substantially independent of one another. If these sequences of code could be executed independently, then an individual program would complete more rapidly. This is especially beneficial in a transaction processing environment as mentioned above.

In such an environment, the processor can select a job (i.e. a group of instructions) for execution when all its resources are available. Such an approach allows the hardware to be employed in program execution for greater percentage of time and avoids the process switching overhead incurred when resources are not available. This improves the efficiency of the overall system.

Some systems require modifications to the program to accomplish parallel execution. Such modifications create code segments that are static in nature. The segmentation is performed either at the time the program is designed or at compile time. Thus, the segments of code are determined in advance without taking advantage of information concerning the state of the machine at a particular point in time. Such information includes the availability of resources and previous branches taken by the execution of the same code segment. This information can be used to create segments of code that are more likely to complete without interruption. Creating such segments statically can actually create a situation that is significantly less efficient for a particular state of the machine.

SUMMARY OF THE INVENTION

A computer system is disclosed for executing a computer program having multiple steps which are intended to provide results in a predetermined order. The system includes a component which groups computer program steps to form concatenated instructions. A further system component combines concatenated instructions into units referred to as jobs. An additional computer system executes the jobs. This additional component is capable of executing jobs so that results are obtained in an order different from the predetermined order.

BRIEF DESCRIPTION OF THE DRAWINGS

FIGS. 4a and 4b are exemplary portions of computer code which are helpful for explaining operation of the present invention.

FIG. 5 is a flow chart diagram illustrating operation of the Restart Mechanism.

OVERVIEW

Figure 1:
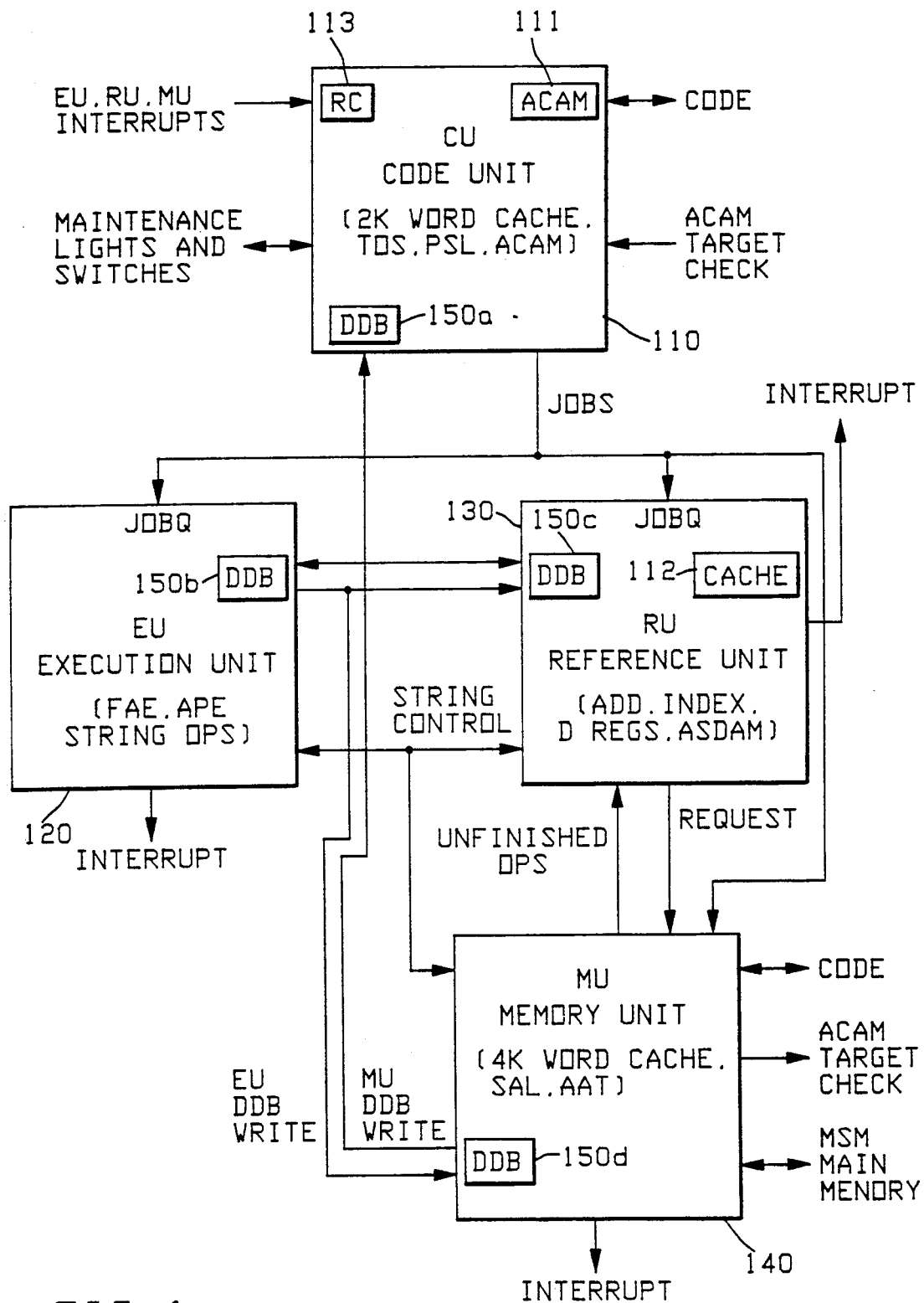
FIG. 1 is a block diagram showing the architecture of the central processing module (CPM).

An exemplary embodiment of the present invention is shown in FIG. 1 The present invention may include four units Code Unit (CU) 110, Execution Unit (EU) 120, Reference Unit (RU) 130 and Memory Unit (MU) 140. Each Unit includes a plurality of registers where data for processing by each unit may be stored. In the exemplary embodiment of the invention, the contents of the plurality of registers from unit to unit are identical. A register may be accessed (through a table) by mapping a variable reference in the computer instruction stream to a particular register within a unit. The table is referred to as an Address Couple Associative Memory (ACAM) 111. If there is no register which corresponds to the variable CU 110, RU 130 and MU 140 may allocate register space, transfer data from memory (or a cache) to this allocated space, and update the ACAM 111 so that future calls to this variable will result in a mapping to the newly allocated register.

Computer instructions may be grouped and executed to provide results in an order different from the intended order. This is accomplished by allocating multiple registers to a single variable. Thus, later sections of code can be executed before earlier sections, and a variable value critical to an earlier section of code can be maintained while a variable value critical to a later section of code is manipulated. A data valid bit corresponds to each register to ensure that a job is not executed before all registers which are used as inputs for job execution contain valid data.

Before a job is executed, CU 110 stores parameters relating to job execution (e.g. initial processor state). This enables a job to be restarted if necessary. Jobs may need restarting due to interrupts, incorrect predictive branches or hardware malfunctions Code Unit (CU) 110 maximizes throughput by combining computer instructions into a concatenated instruction. A plurality of processor resources are then allocated to this instruction, thus forming a job. A job may then be issued to Execution Unit (120). When the data valid bits corresponding to the registers associated with a particular job become valid, that job is then executed by EU 120. Alternatively, a job may be issued to Reference Unit (RU) 130 if the aforementioned ACAM updating is required If a job requires restarting, CU 110 may reissue the job to the appropriate units for re-execution.

DETAILED DESCRIPTION

A Central Processing Module in accordance with an exemplary embodiment of the present invention is shown in FIG. 1. The CPM comprises a plurality of units including Code Unit (CU) 110, Execution Unit (EU) 120, Reference Unit (RU) 130 and Memory Unit (MU) 140. The function of each unit is discussed separately.

Each unit (i.e. CU 110, EU 120, RU 130, MU 140) includes a respective plurality of data registers. In an exemplary embodiment of the present invention, each of these plurality of registers is organized as a register file which is referred to as the Distributed Data Buffer (DDB) 150a-d. The contents of all DDBs are identical. Furthermore, when a DDB is updated, all DDBs are similarly updated. Almost all data items within the processor are managed with Register Numbers which point to entries within each DDB. In an exemplary embodiment of the present invention, sixty-four (64) Register Numbers are dynamically assigned within each DDB.

A valid bit is associated with each DDB location. The valid bit of a register is reset upon allocation of a Register by CU 110 and is set when a value is written to a DDB location by either EU 120, RU 130 or MU 140.

CODE UNIT

CU 110 receives a stream of computer instructions from MU 140. As the instructions are received, CU 110 attempts to concatenate them to form three address instructions. This is more fully described in U.S. patent application Ser. No. 07/498,281 which is incorporated herein by reference for its teachings in the field of instruction stream processing. CU 110 then issues this concatenated code to one of the remaining units in the CPM in the form of a job.

In order to keep track of jobs as they progress from inception through completion, each job is assigned a job number. Job Numbers are sequentially assigned to jobs as they are issued by CU 110. A Job Number is not re-used until it has been de-allocated by CU 110.

CU 110 maintains a Processor State List (PSL). The PSL includes a plurality of Register Numbers which are used to record Boolean Flags, and address values relating to jobs which are being executed or are ready for execution.

CU 110 also maintains a Restart RAM which is used in the event a job is terminated prematurely due to improper execution. The PSL is maintained within the Restart RAM. The Restart RAM is addressed using job numbers. Operation of the Restart RAM is described below with reference to FIG. 5.

Figure 2:
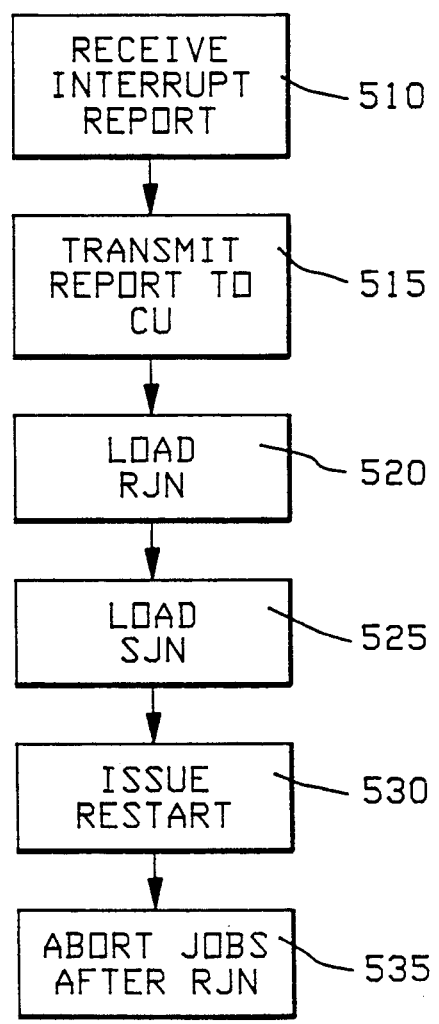
FIG. 2 is a diagram showing the configuration of registers within the Address Coupled Associative Memory.

In order to allow the CPM to complete one job per clock, it is helpful to reduce the data referencing requirements of the code. This is accomplished with the use of an Address Couple Associative Memory (ACAM) 111. Program instructions include references within the code stream that correspond to variable names. In the exemplary embodiment of the invention, these references are in the form of address-couples. ACAM 111 is a memory within CU 110 which forms a small fully associative store through cache. In an exemplary embodiment of the present invention, ACAM entries have the information shown in FIG. 2. As shown, ACAM 111 includes a field for address couples (which are obtained from the program instructions) and a field for Register Numbers (which may correspond to a collection of registers in which the data value assigned to the variable may be stored). Alternatively, the rightmost ACAM field of FIG. 2 may correspond to Register Numbers within the DDB. Operation of ACAM 111 is described in combination with the DDB, although it will be understood that any collection of registers may be used.

ACAM 111 operates by associating address couples with DDB Register Numbers. When an address couple appears in the code stream of an executing job, it is compared to address couples in the ACAM 111 to determine if the data is already in a DDB register. If the address couple is found, the associated DDB Register Number is provided as an input value, thus eliminating an address evaluation operation and a fetch from memory. If the address couple is not found in ACAM 111, then a replaceable ACAM location is picked and a register within the DDB is allocated. The address couple is entered into the ACAM entry together with the Register Number corresponding to the target of the Address Couple. The data referenced by the program instruction is then fetched from memory and inserted in the allocated DDB register.

In order to keep track of available registers within the DDB, a used Register Number Table is maintained. This table tracks registers being used by jobs (through their associated register numbers) and provides free registers for new jobs. If all registers within the DDB become allocated, CU 110 stops executing new jobs until a predetermined number of DDB registers become de-allocated. A DDB register is de-allocated when all references to that DDB register (e.g. from ACAM 111) have been deleted.

When an attempt is made to store a value into a previously assigned DDB register via an ACAM entry, a new DDB register is allocated to receive this value. Thus, multiple copies of a Program Variable may be maintained. This is referred to as renaming. By maintaining multiple copies of a Program Variable, the order of execution of program code can be varied, without affecting the accuracy of results. This is more fully described below with reference to FIG. 4.

REFERENCE UNIT

The primary purpose of RU 130 is to generate memory references at the request of CU 110. RU 130 accomplishes this by receiving jobs from CU 110 which request the generation of memory references. These jobs may be stored in an Address Couple (AC) job queue within RU 130. RU 130 processes jobs as input register numbers become valid subject to ordering constraints imposed by older writing jobs. The result of the job is sent to MU 140 where a cache/memory access can be performed and loaded into each DDB 150a-. If further processing is required by RU 130, an Unfinished Op (UFO) Queue input to RU 130 is activated.

EXECUTION UNIT

EU 120 processes data function jobs received from CU 110. Examples of data function jobs include arithmetic operations, string operation, field operations and logical operations. These jobs are stored in one of two job queues—an S job queue (for jobs in which there is a high probability that data is local to EU 120) and a V job queue (for all other jobs). Only one job can be issued at a time. An issued job can be executed in one of two execution units—a Fast Arithmetic Element (FAE) for simple operations or an All Purpose Element (APE) for more complex operations. A job may also be issued to a Data Array Processor to perform Data Array Operations.

MEMORY UNIT

MU 140 makes cache/memory data available to the remaining units within the CPM. MU 140 has a write-back data cache. Furthermore, MU 140 is the interface between the memory system and the remaining units in the CPM. The MU's interface with CU 110 allows the MU to respond to CU code requests and to memory code cache purge requests. The MU 140 also acts as an extension of the pipeline through the RU 130 and data cache 112 to the DDB.

JOB EXECUTION

Figure 3:
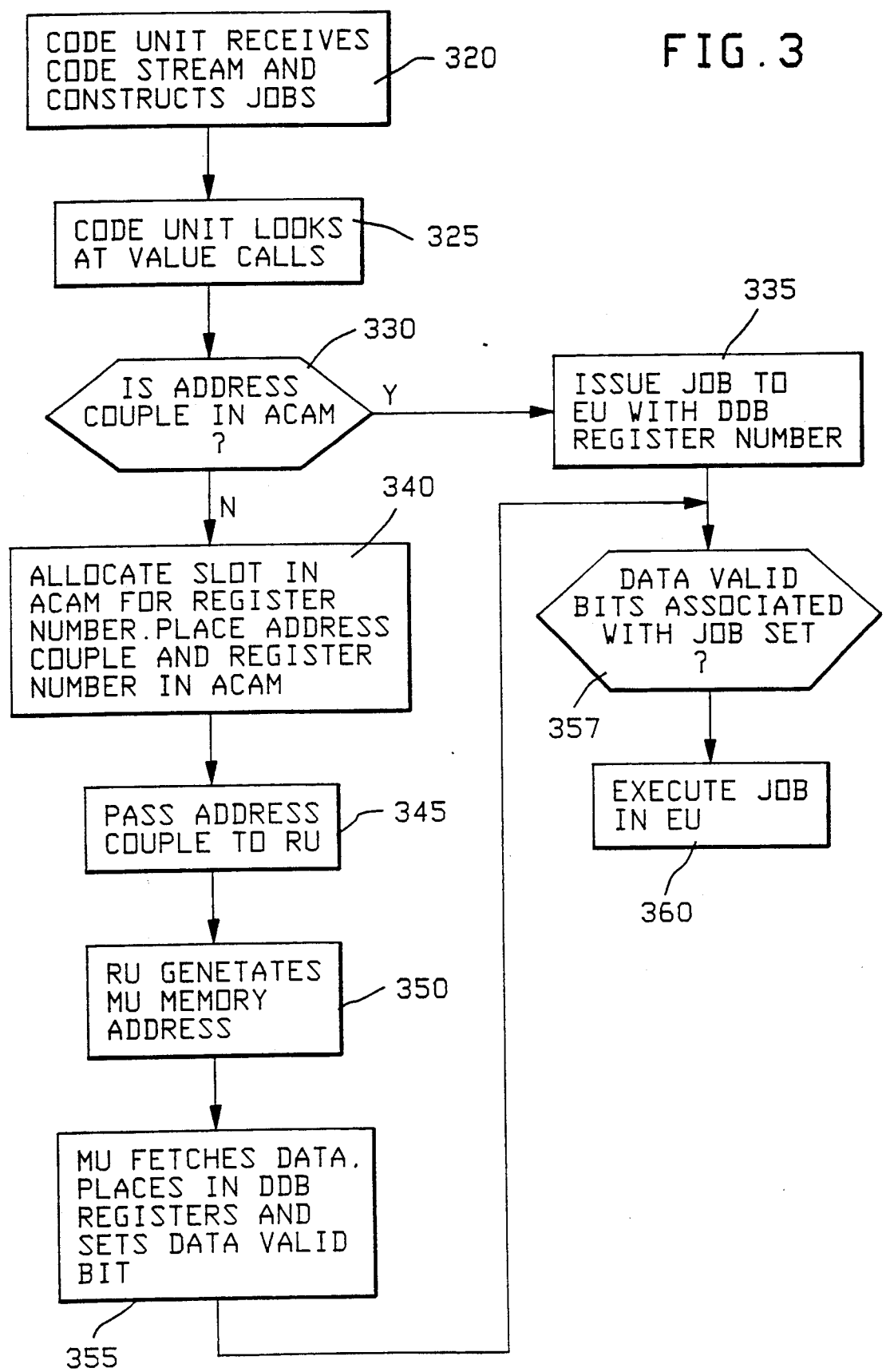
FIG. 3 is a flow chart diagram which is useful for describing the execution of a CPM generated job.

Operation of an exemplary embodiment of the present invention is illustrated by the flowchart diagram of FIG. 3.

At step 320, CU 110 receives the code stream and constructs a plurality of jobs. This is accomplished by a code concatenation portion and a job processing portion, each desirably located within CU 110. The code concatenation portion receives the code stream and groups instructions into a plurality of concatenated instructions. This operation is described in the above referenced patent application Ser. No. 07/498,281. The job processing portion allocates any resources required by the concatenated instructions, thus forming a plurality of jobs. A job number is associated with each job formed by CU 110.

At step 325, CU 110 evaluates the program variables within each job to determine, if, at step 330, the address couple of the evaluated program variable is within the ACAM. If the address couple is within the ACAM, then, at step 335, the CU obtains the corresponding DDB Register Number from the ACAM and issues the job to EU 130 with the Register Number. Otherwise, if the address couple is not in the ACAM, then, at step 340, CU 110 allocates a slot in the ACAM for the Register Number and places an Address Couple with an associated Register Number in the ACAM.

At step 345, CU 110 passes the address couple from the job to RU 120 to fetch the data value from memory.

At step 350, RU 120 generates a memory address for MU 140. This address is used to fetch the requested data.

At step 355, MU 140 fetches the requested data (from either the cache or, if necessary, from main memory), places this fetched data in the appropriate DDB register, and sets the appropriate data valid bit.

When (at step 357) all of the data valid bits associated with a particular job have been set, then, at step 360, the job in EU 110 can be executed.

OUT OF ORDER JOB EXECUTION

Using the renaming function in the Distributed Data Buffer, out of order job execution may be achieved. This is explained using the illustrative examples of FIG. 4a and FIG. 4b. In FIG. 4a, at step 10, program variables a and b are added together, and the sum is deposited in a register corresponding to program variable x. At step 30, FIG. 4a, program variables c and d are also added together, and the sum is also deposited in the x register Thus, step 30 may overwrite the value of x which is stored at step 10. At step 40, FIG. 4a, some function is applied to the value of x which was determined at step 30, and the result of applying this function is stored in y.

Because step 40 is performed using a value of x which has been determined at step 30, the sequence of steps shown in FIG. 4a are desirably performed sequentially. If the steps shown in FIG. 4a were performed in a non-sequential manner (e.g. first step 30, then step 10, and finally step 40), the function of step 40 will receive x, calculated from step 10, as input, instead of the value of x, calculated from step 30. If this situation were to occur, the value of y, calculated at step 40 may not be correct.

It is not always desirable, however, to perform a group of computer instructions in sequential order. Often, computational efficiency may be improved by performing a group of computer instructions in non-sequential order. By performing instructions in non-sequential order, an optimization in resource utilization may be realized. As shown above, however, care should be taken to ensure that programs executed in a non-serial manner do not produce erroneous results.

The present invention overcomes these difficulties by providing multiple storage locations, as needed, for each accessed variable using the renaming function. This is illustrated in FIG. 4b. The program shown in FIG. 4b is nearly identical to the computer program shown in FIG. 4a. However, in FIG. 4b, separate storage locations are provided for the access of variable x in line 10 and the access of variable x in line 30. This is accomplished by using the renaming function. For clarity, x in FIG. 4a has been replaced with $x_o$ and $x_n$ in FIG. 4b. In this manner, in FIG. 4b, instructions 30 and 40 can be executed independently of the time when instructions 10 and 20 are executed. Thus, instructions 30 and 40 may be executed before instructions 10 and 20 are executed, due to the fact that the value of x at different points in the computer program is maintained.

In order to allow quick access to each variable (and each variable's respective copies) space is allocated within the DDB for each variable (and variable copy). Space may also be de-allocated from the DDB when it is no longer necessary to retain a variable value. A valid bit is associated with each allocated space within the DDB. This valid bit indicates when a variable value has been stored in an appropriate storage location, and when the variable value may be accessed by subsequent instructions.

Referring again to FIG. 4b, $x_o$ may be allocated space in register 1 (R1) of the DDB and $x_n$ may be allocated space in register 2 (R2) of the DDB. When the sum of a and b has been stored in RI, the valid bit associated with R1 is set. Similarly, when the sum of c and d has been stored in R2, the valid bit associated with R2 is set. When the valid bit associated with a particular variable has been set, that variable may be used for further computation. In this manner, the order of execution of a particular sequence of computer code may be altered.

In an exemplary embodiment of the present invention, the Reference Unit (RU) 130 and the Execution Unit (EU) 120 each contain a queue of jobs that are scheduled for execution in each unit. As previously stated, jobs are entered into each of these queues by the Code Unit (CU) 110. Thus, the jobs which have been waiting the longest time for execution are located at the front of these queues. Jobs which have been waiting the shortest time for execution are located at the back of these queues.

Both the Reference Unit 130 and the Execution Unit 120 can examine the jobs in their respective queues and can determine, from the valid bits associated with the DDB, which jobs may be executed Thus, some jobs may be ready for execution while other jobs may not be ready for execution. A serial machine would be restricted in the order with which it can execute jobs in either of these queues. Because, in the present invention, jobs may be executed as soon as all input variables have been determined, it is possible to execute jobs in any order within the queues. In this manner, utilization of the Reference Unit 130 and the Execution Unit 120 is increased, compared with serial job execution.

Although a valid data bit may be associated with the validity of data within a register, a valid data bit may also indicate the availability of a system resource (e.g. system tasks, hardware devices, etc.) Thus, the data valid bits may be examined to determine resource availability before a job is executed.

In addition to signaling the validity of inputs to jobs, registers (through their associated Register Numbers (RNs)) are also used to indicate the completion of jobs. Each job issued by CU 110 has one RN designated as its end RN. The end RN is the output RN for jobs with single outputs; for jobs with multiple output RNs, one of the output RNs is designated as the end RN. When the valid bit associated with the end RN is set, the job associated with the end RN has completed. It is desirable for CU 110 to know when a job completed so that various resources (i.e. registers) can be de-allocated.

RESTART

In addition to providing Out Of-Order job execution, the present invention includes a mechanism which allows for the system to be restarted for a variety of reasons, such as errors and interrupts. Exemplary reasons for initiating a restart include incorrect conditional branch prediction, processor internal error, and environmental fault (i.e. disk head crash, memory parity error, etc.).

Because of its error handling abilities, the restart mechanism may also be characterized as a recovery mechanism. While the restart mechanism can be used in any type of computer processing environment, this mechanism is particularly suited to the present environment. In particular, this mechanism is particularly suited for an environment in which computer program results are obtained in an order different from their intended order.

As described below, the restart mechanism is implemented in the CU 110. In order to provide the recovery ability which is available from this mechanism, CU 110 maintains Recovery RAM (RC) 113. Referring to FIG. 1, RC 113 maintains a plurality of records, with each record assigned to a particular job (and thus a particular job number). Each record maintains a variety of information associated with a particular job, such as:

1) Current Code Pointer—This points to the first operator in the code stream for the job.
2) Alternate Code Pointer—This may point to a branch destination. Alternatively, it may point to a predicted branch destination.
3) End Register Number—This is used for determining when a job has reached completion, as described above.
4) Processor State List—As described above, this includes specific state information for a specific job which may be needed for a proper restart. This information includes the register numbers for state items which may be held in a DDB register. Therefore, these registers cannot be reused for a different job until they are no longer needed for a potential restart.
5) Interrupt Offsets—These may be used for generating interrupt vectors.

It is contemplated that each record may contain additional information to facilitate job restart. Such information is dependent on individual details of computer system implementation. Such details may include but are not limited to: copies (or partial copies) of any stacks or queues, historical information relating to prior attempts to execute the job and particular modes of operation.

The above information, referred to as job information, is saved for a particular job in RC 113 by CU 110. This saving occurs upon the creation of the job associated with the particular job information.

Operation of the Restart Mechanism is illustrated in FIG. 5. The need for a restart may be determined by job control logic (not shown) within EU 120. In particular, the job control logic in EU 120 keeps track of the progress of jobs that are active. The job control logic receives interrupt reports, if any, from other processing elements within the computer system as interrupt conditions are detected (step 510). EU 120 then formats each interrupt report and passes each interrupt report to CU 110 (step 515).

Upon receiving an interrupt report, CU 110 selects the oldest, highest priority interrupt among those received and loads the job number of the job that caused this interrupt into a current restart job number (RJN) register (step 520). If more than one interrupt arrives simultaneously with the same job number and priority, CU 110 arbitrarily selects one interrupt causing job. The job number corresponding to the next job to be run is loaded into a skip job number (SJN) register (step 525).

Using the RJN, CU 110 issues a restart instruction to all remaining units (step 530). The restart instruction includes the RJN, i.e. the job number corresponding to the job which requires restarting. The remaining units continue to operate, performing all jobs older than the RJN. In the meantime, CU 110 attempts to diagnose the problem that necessitated invocation of the restart mechanism. When the oldest job number in the machine is greater (younger) than or equivalent to the restart have completed. When this condition is met, all interupt have completed. When this condition is met, all units abort all jobs having numbers that are greater than or equal to the job intended for restarting (i.e all jobs after the RJN), discard results obtained by all jobs after the RJN, and clear any queues within the units which are used for processing individual jobs (step 535).

CU 110 also sets the processor to its state prior to restarting the job corresponding to the RJN. Furthermore, the skip job number (SJN) is loaded as the oldest pending job (OPJ) into the OPJ register.

Upon determining what remedial measures to take in order to handle the interrupt condition, CU 110 begins issuing appropriate jobs to handle the interrupt.

These are illustrated through several examples.

Figure 6:
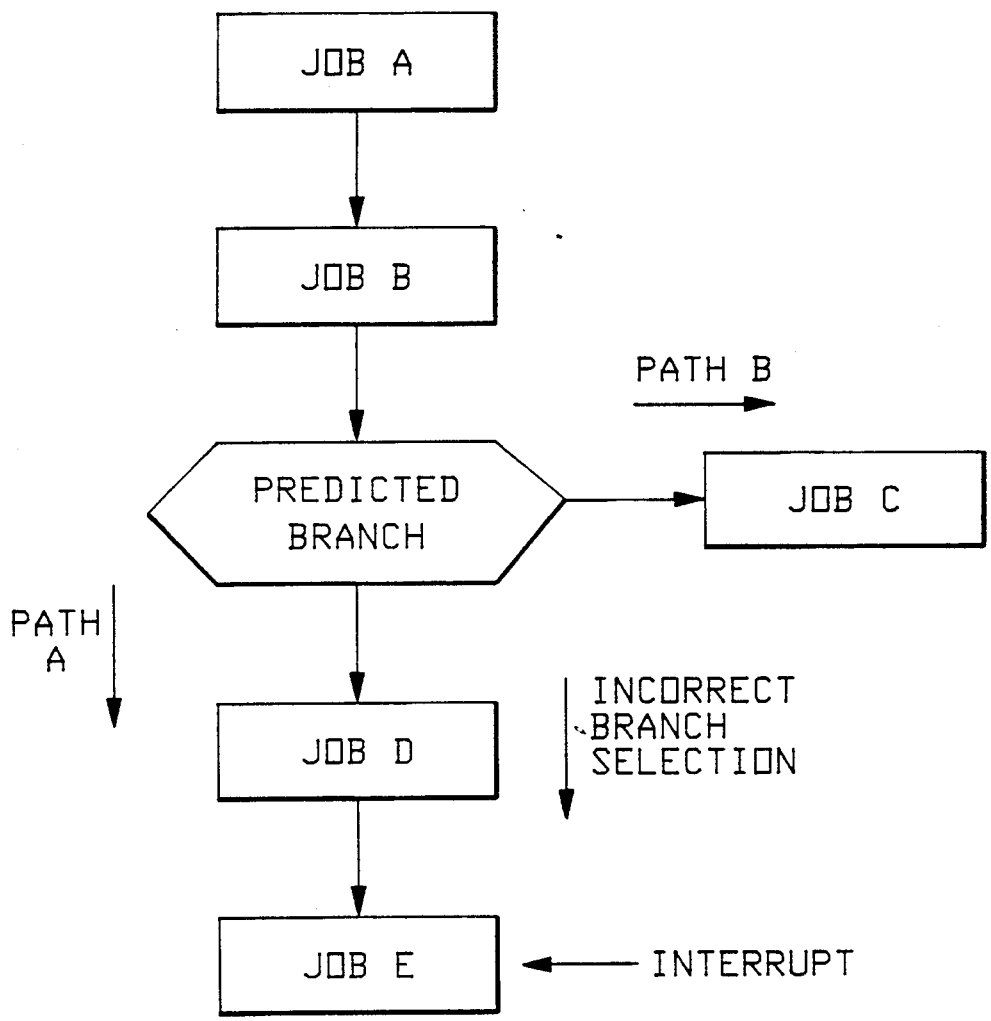
FIG. 6 is a flow chart diagram illustrating a predicted branch instruction which is helpful for explaining the operation of the Restart Mechanism.

In the first example, as illustrated FIG. 6, an interrupt is caused by an incorrect selection. The incorrect branch selection along path A may result, in turn, from an incorrect predicted branch. Thus, the jobs in the restart range associated with the incorrect branch selection (Job D and Job E) will be discarded since the incorrect branch selection should not be executed again. Instead, CU 110 immediately begins issuing code to execute the alternative branch of the given process (Job C). Jobs in the restart range which are unrelated to the process which received the incorrect branch interrupt are also restarted.

In the second example, an interrupt is caused by a bad entry error, such as a program variable with an invalid target. In a code sequence which includes two program variables followed by an add, if one of these variables has an invalid target, concatenation of this code sequence into a job and execution of this job will result in an error. Following a subsequent interrupt, CU 110 issues a restart command to each of the units. When all units have completed execution of all jobs older than the RJN, CU 110 issues each of the three mentioned codes as separate jobs (rather than as a single job). When an error occurs again (because the program variable still has an invalid target), CU 110 can isolate the program variable which caused the error. CU 110 can then invoke an appropriate interrupt handling routine for the particular type of error.

In addition, all jobs after the RJN which are unrelated to the job that contained the error are discarded. Although these jobs may have completed their execution prior to the error interrupt, any results obtained from jobs after the RJN should desirably be deleted. This is desirable since it may be inefficient to determine the accuracy of results obtained from these jobs.

In the third example, the operation which caused the restart is restarted from the point of interrupt (as opposed to the point of inception of the operation). A specific example of this type of situation occurs during the process of updating an array consisting of thousands of array elements. At some point in the updating process, a portion of the array may not be present in memory. In this instance, an interrupt occurs so that the operating system can bring the data into memory from a mass storage device such as a disk drive.

Thus, this third example differs from the first and second examples, in which the work completed by the job being restarted was discarded. In this third example, during the interrupt handling procedure, that portion of the array update which has been completed is so identified by MU 140. After the remaining portion of the array has been brought into memory, the interrupt handling procedure signals CU 110 to generate a specialized job (an array update job) that continues array update from where the previously completed operation left off. If such a method were not used, large array updates would be difficult to complete unless the entire array was simultaneously in memory local to the processor.

Figure 7:
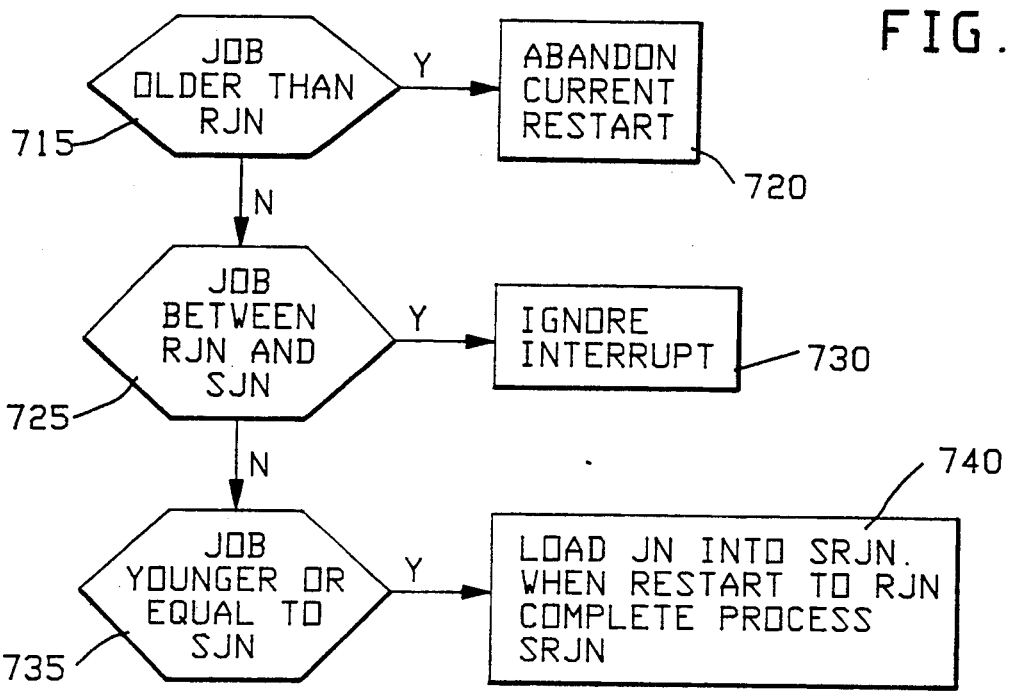
FIG. 7 is a flow chart diagram illustrating the operation of an aspect of the Restart Mechanism.

The restart mechanism includes a predetermined protocol for handling the occurrence of an interrupt while a restart to RJN is active. This is illustrated in FIG. 7. There are three cases:

1) If a job older than RJN is causing an interrupt (step 715), the current restart is abandoned and a new restart is initiated (step 720).
2) If a job between RJN and SJN is causing an interrupt (step 725), the interrupt is ignored because the job causing the interrupt is in the process of being aborted (step 730).
3) If a job younger than or equal to SJN is causing an interrupt (step 735), the corresponding job number is loaded into a save restart job number (SRJN) register (step 740). The SRJN is retained by CU 110 until the restart to RJN has completed. At that point, the SRJN is processed.

Figure 8:
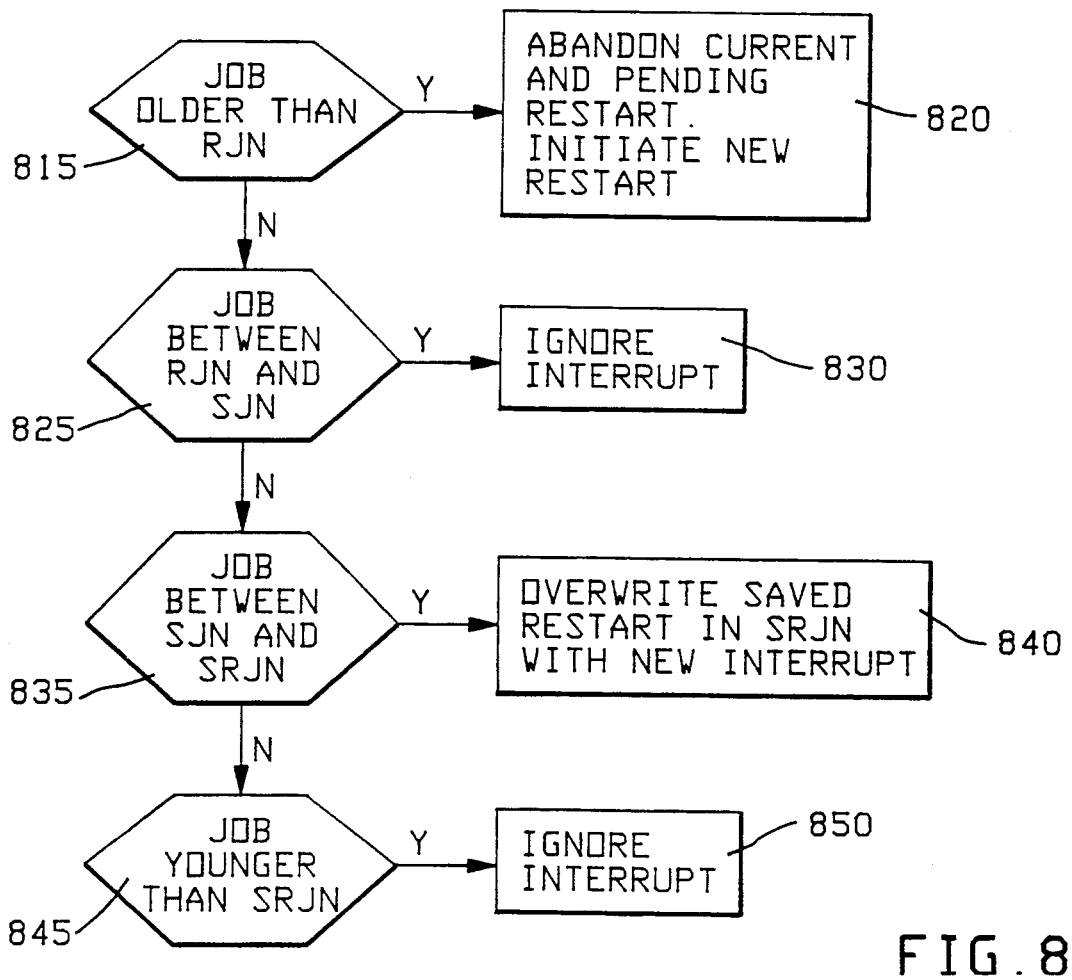
FIG. 8 is a flow chart diagram illustrating the operation of an additional aspect of the Restart Mechanism.

Relating to the third case described above, where a restart to RJN is active and a pending restart is saved in SRJN, there are four more specific situations. These are illustrated by FIG. 8:

1) If a job older than RJN is causing an interrupt (step 815), then both the current restart and the pending restart (SRJN) are abandoned and a new restart is initiated (step 820).
2) If a job between RJN and SJN is causing an interrupt (step 825), the interrupt is ignored because the job is in the process of being aborted (step 825).
3) If a job between SJN and SRJN is causing an interrupt (step 835), the saved restart in SRJN is overwritten with the new interrupt (step 840).
4) If a job younger than SRJN is causing an interrupt (step 845), the interrupt is ignored because the younger job will be aborted when the pending restart is serviced (step 850).

An additional aspect of the restart mechanism relates to management of the ACAM. Transactions to ACAM are performed with the assumption that the associated jobs are valid. In reality, the associated jobs may eventually be deleted due to the restart of an earlier job. Furthermore, if a job which resulted in an ACAM entry (i.e. created multiple storage locations for a single variable) is deleted, that ACAM entry is desirably discarded to prevent any further use of the renamed DDB register. For this reason, each ACAM entry desirably has the job number of the job which generated the ACAM entry.

In order to minimize the deletion of ACAM entries on a restart, the RJN is compared against each ACAM entry. Each ACAM entry which is not older than the RJN is invalidated. Furthermore, as each job is deallocated (following the job's completion), a special valid bit associated with each ACAM entry is reset. By resetting this bit, restart compares with entries older than the oldest job in the processor are thereby disabled.

While the invention has been described in terms of an exemplary embodiment, it is contemplated that it may be practiced as outline above, with modifications within the spirit and scope of the appended claims.

What is claimed is:

1. Apparatus for executing a computer program, said computer program including a plurality of steps whereby execution of said steps produces a plurality of results corresponding to said plurality of steps, said plurality of steps intended to provide said plurality of results in a predetermined order, said apparatus comprising:
concatenation means for combining ones of said plurality of steps to form a plurality of concatenated instructions according to a plurality of predetermined rules;
job construction means, coupled to said concatenation means, for forming a plurality of jobs, wherein each job includes a different one of said plurality of concatenated instructions; and
job execution means, coupled to said job construction means, for executing said plurality of jobs to produce a plurality of results in an order so that said plurality of results are obtained in a sequence different from said predetermined order.

2. The apparatus of claim 1, wherein ones of said plurality of steps access a respective plurality of variables, said apparatus further comprising:
register means for storing a respective plurality of values defined by said plurality of variables in a respective plurality of memory locations; and associative memory means for mapping each of said plurality of variables to at least one of said plurality of locations.

3. The apparatus of claim 2, further comprising reference unit means, coupled to said job execution means, for allocating said respective plurality of memory locations in said register means.

4. The apparatus of claim 3, wherein said apparatus includes a memory, and memory unit means for transferring data between said memory and said reference unit means.

5. The apparatus of claim 1, further comprising:
means for interrupting said job construction means on the detection of an error during the execution of one of said jobs; and
restart means, responsive to said means for interrupting, for restarting said one job.

6. The apparatus of claim 5, wherein said restart means includes means for forming a further plurality of jobs for execution by said job execution means, wherein each job of said further plurality of jobs includes a different one of said plurality of steps from which said one of said plurality of concatenated instructions was formed.

7. The apparatus of claim 5, wherein a plurality of job execution parameters is associated with each of said plurality of jobs, and ones of said plurality of job execution parameters are used by said restart means to restart said associated job, and wherein said concatenation means and said job construction means are included in a code unit which stores said plurality of job execution parameters.

8. The apparatus of claim 1, wherein said apparatus includes a plurality of resources, and wherein said job construction means further includes allocation means for allocating said plurality of resources among said plurality of concatenated instructions.

9. The apparatus of claim 1, wherein said job execution means includes at least one arithmetic processor for determining at least one of said plurality of results.

10. Apparatus for executing a computer program, wherein said computer program includes a plurality of steps which reference at least one main variable, said apparatus comprising:
means for replacing said main variable with a plurality of temporary variables, wherein each of said plurality of temporary variables replaces said main variable at a respectively different one of the plurality of steps;
register means, including a plurality of locations, for storing data values;
means for assigning at least one of said plurality of locations within said register means to said plurality of temporary variables;
execution means for executing ones of the plurality of steps when it is determined that respective selected ones of said plurality of locations within said register means have a valid data value.

11. The apparatus of claim 10, further comprising a valid data array which includes a plurality of locations, each location in said valid data array indicating the validity of a respective one of the temporary variables in the register file.

12. The apparatus of claim 11, further comprising:
means for constructing a job, wherein said job includes an operator and references to selected ones of said plurality of temporary variables.

13. The apparatus of claim 12 wherein said execution means includes means for executing said job, responsive to one of said plurality of locations in said valid data array indicating that the corresponding location in said register file contains valid data.

14. Apparatus for executing a computer program, aid computer program including a plurality of steps whereby ones of said plurality of steps access a plurality of variables and whereby execution of said steps produces a plurality of results corresponding to said plurality of steps, said plurality of steps intended to provide said plurality of results in a predetermined order, said apparatus comprising:
code unit means for combining ones of said plurality of steps to form a plurality of concatenated instructions according to a plurality of predetermined rules and for forming a plurality of jobs from different ones of said plurality of concatenated instructions;
job execution means for executing said plurality of jobs to produce said plurality of results, wherein said plurality of results are obtained in an order different from said predetermined order;
memory unit means for storing data for manipulation by ones of said plurality of steps; and
reference unit means for providing data to said job execution means for manipulation by ones of said plurality of steps, wherein a portion of said data provided to said job execution means is retrieved from said memory unit means.

15. A method of executing a computer program, wherein said computer program includes a plurality of steps such that execution of said steps produces a plurality of results corresponding to said plurality of steps and said plurality of steps are intended to provide said plurality of results in a predetermined order, said method comprising the steps of:

a) combining ones of said plurality of steps to form a plurality of concatenated instructions according to a plurality of predetermined rules;
b) forming a plurality of jobs, wherein each job includes a respectively different one of said plurality of concatenated instructions; and
c) executing said plurality of jobs to produce said plurality of results in an order so that said plurality of results are obtained in a sequence different from said predetermined order.

16. A method of resolving an interrupt condition resulting from an interrupt incurred while executing a job in a computer system, said interrupt causing said job to be interrupted, wherein said computer system includes means for creating jobs, said method comprising the steps of:
a) detecting said interrupt condition;
b) aborting a plurality of jobs so that a job is interrupted; said plurality of jobs including at least one of a job created at the same time as the interrupted job and a job created later than the interrupted job; and
c) executing a plurality of restart instructions, wherein said plurality of restart instructions include the interrupted job and said job created later than the interrupted job.

17. The method of claim 16, wherein said computer system includes a plurality of memory location, said job includes a plurality of steps, ones of said plurality of steps access a plurality of variables, a plurality of entries are created for mapping ones of said plurality of variables to said plurality of memory locations, each of said plurality of entries is associated with at least one of said plurality of jobs and ones of said plurality of jobs are abandoned responsive to said interrupt condition, said method further comprising the step of deleting at least one of said plurality of entries associated with said abandoned ones of said plurality of jobs.

18. The method of claim 16, wherein said computer system includes means for resolving a further interrupt condition resulting from a further interrupt incurred while executing a further interrupted job, and wherein, upon receiving said further interrupt, said method further comprises the steps of:
d) abandoning said plurality of restart instructions and executing a new plurality of restart instructions wherein said new plurality of restart instructions includes said further interrupting job, if said further interrupting job was created earlier than said interrupting job;
e) ignoring said further interrupt if said further interrupting job was created at a time after said interrupting job was created and not later than the time that the job created later than the interrupting job was created; and
f) executing said further interrupting job after executing said plurality of restart jobs if said further interrupting job was created after said job created later than the interrupting job was created.

* * * * *